US012785240B2

(12) United States Patent
Saqueb

(10) Patent No.: US 12,785,240 B2
(45) Date of Patent: Nov. 3, 2026

(54) DUAL-PROBE MICROSTRIP TRANSITION TO AIR-WAVEGUIDE RADAR SYSTEM

(71) Applicant: Aptiv Technologies AG, Schaffhausen (CH)

(72) Inventor: Syed An Nazmus Saqueb, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 156 days.

(21) Appl. No.: 18/787,032

(22) Filed: Jul. 29, 2024

(65) Prior Publication Data

US 2026/0031518 A1 Jan. 29, 2026

(51) Int. Cl.

*H01P 5/107* (2006.01)
*G01S 7/02* (2006.01)
*G01S 13/931* (2020.01)

(52) U.S. Cl.

CPC .............. *H01P 5/107* (2013.01); *G01S 7/027* (2021.05); *G01S 13/931* (2013.01)

(58) Field of Classification Search

CPC ......... H01P 5/107; G01S 7/027; G01S 13/931
USPC ......... 333/21 R, 26, 33, 174, 230, 246, 248, 333/255
See application file for complete search history.

(56) References Cited

U.S. PATENT DOCUMENTS 10,777,899 B2 9/2020 Tong et al.
2018/0358677 A1* 12/2018 Artemenko ............. H01P 1/042

FOREIGN PATENT DOCUMENTS

CN 114188686 A 3/2022

OTHER PUBLICATIONS

Extended European Search Report regarding European Patent Application No. 24203187.0, dated Mar. 20, 2025.

(Continued)

*Primary Examiner* — Jorge L Salazar, Jr.
(74) *Attorney, Agent, or Firm* — Harness, Dickey & Pierce, P.L.C.

(57) ABSTRACT

A planar dual-probe microstrip transition includes an input element connectable to a source of electrical energy and a base member connected to the input element. The base member includes a first end, a second end, and an intermediate portion. A first probe member extends from the base member. A second probe member extends from the base member substantially parallel relative to and spaced from the first probe member. A tuning member extends from the first probe member toward the second probe member. The tuning member establishes a phase difference between electrical energy flowing through the first probe member and electrical energy flowing through the second probe member.

15 Claims, 3 Drawing Sheets

(56) References Cited

OTHER PUBLICATIONS

"Ultra-Wideband Narrow Wall Waveguide-to-Microstrip Transition Using Overlapped Patches," Ivan Zhou et al., Sensors, XP093253044, dated Apr. 12, 2022.
"Compact Wideband Single-Ended and Differential Microstrip-to-Waveguide Transitions at W-Band," M. Giese et al., 2015 IEEE MTT-S International Microwave Symposium, 2015, pp. 1-4.
"A Wide Band Transition From Waveguide To Differential Microstrip Lines," Z. Tong, et al., 2008 Asia-Pacific Microwave Conference, 2008, pp. 1-4.
"A Millimeter Wave Wideband Differential Line To Waveguide Transition Using Short Ended Slot Line," T. Yuasa et al., 2014 44th European Microwave Conference, Oct. 2014, pp. 1004-1007.
"A Full W-Band Waveguide-to-Differential Microstrip Transition," B. Deutschmann et al., 2019 IEEE MTT-S International Microwave Symposium (IMS), 2019, pp. 335-33.

* cited by examiner

DUAL-PROBE MICROSTRIP TRANSITION TO AIR-WAVEGUIDE RADAR SYSTEM

FIELD

The present disclosure relates to waveguide antennas for automotive radar systems and, more particularly, to a dual-probe microstrip transition to air-waveguide system for automotive radar systems.

BACKGROUND

This section provides background information related to the present disclosure which is not necessarily prior art.

Automotive radar sensors are used in vehicle sensing systems to determine information about objects in the environment of the vehicle, such as the location, size, orientation, velocity, and acceleration of objects in the environment of the vehicle. The sensed information can, for example, be used by other vehicle systems, such as autonomous driving systems and/or advanced driver assistance systems (ADAS), etc., to control steering, braking, throttle, and/or other vehicle systems.

Some prior automotive radar systems use printed circuit board (PCB) antennas wherein the radar system includes a control PCB that includes processing components for the radar system, such as one or more microprocessors, one or more power supplies, other integrated circuits (ICs) such as monolithic microwave integrated circuits (MMIC), etc., as well as an additional antenna PCB attached to the control PCB and connected to the MMIC. The additional antenna PCB is made of high-performance radio frequency (RF) material and includes antenna components that function as the antenna for the radar system. The PCB antenna radiators, for example, can be implemented using microstrip patches, microstrip stubs, microstrip meander lines, planar microstrip transitions/probes and the like. The antenna PCB can be attached to the control PCB using adhesive.

Typically, a waveguide is positioned over a planar microstrip probe. The waveguide collects and guides RF energy from the probe. The RF energy is then directed from the MMIC towards the antenna. In some cases, the waveguide transitions the RF energy vertically from the planar microstrip probe. In such systems, the transition results in an upward firing of the RF energy. With this arrangement, the MMIC and the planar microstrip probe can reside on the same side of the PCB.

Managing spacing between adjacent planar microstrip probes and waveguides is challenging. The planar microstrip probes are connected to vias formed in the PCB. Via layers are very short. As such, maintaining a tight manufacturing tolerance on via position is challenging and thus variations occur in via-to-metal layer registration. In addition to accommodating via-to-metal layer tolerances, the planar microstrip probe itself has a certain width that imposes limits on waveguide-waveguide spacing.

Vertical or upward firing arrangements provide an opportunity to create a more compact port layout by aligning probes and waveguides next to one another. Increasing the number of emitters on the PCB under existing current constraints will require an increase in PCB size. Increasing PCB dimensions will invariably lead to longer feed lines which, in turn, will lead to larger losses and a drop in system efficiency. Tightening manufacturing tolerances to ensure a better via-to-metal registration will increase costs undesirably. Accordingly, the industry would welcome changes in probe design that would result in a smaller probe width that can accommodate tighter waveguide to waveguide spacing and which is indifferent to via-to-metal registration anomalies.

SUMMARY

This section provides a general summary of the disclosure and is not a comprehensive disclosure of its full scope or all of its features.

A planar dual-probe microstrip transition for an automotive radar system, in accordance with the present disclosure, includes an input element connectable to a source of electrical energy and a base member connected to the input element. The base member includes a first end, a second end, and an intermediate portion. A first probe member extends from the base member. The first probe member includes a first end portion connected to the first end of the base member and a second end portion. A second probe member extends from the base member substantially parallel relative to and spaced from the first probe member. The second probe member includes a first end section joined to the second end of the base member and a second end section that is cantilevered from the base member. A tuning member extends from the second end portion of the first probe member toward the second end section of the second probe member. The tuning member establishes a phase difference between electrical energy flowing through the first probe member and electrical energy flowing through the second probe member.

In other features, the tuning member includes a first end segment joined to the second end of the first probe member and a second end segment that is spaced from the second end section of the second probe member.

In other features, the first end segment of the tuning member has a first dimension, and the second end segment of the tuning member includes a second dimension that is distinct from the first dimension.

In other features, the second dimension is less than the first dimension forming a stepped region at the second end segment.

In other features, the input element, the first probe member, and the second probe member extend along a first axis, the first dimension and the second dimension being defined relative to the first axis.

In other features, the first probe member is spaced from the second probe member relative to a second axis that is substantially perpendicular relative to the first axis a selected distance, the selected distance establishing an output frequency for the planar dual-probe microstrip transition.

In other features, a matching stub provides an interface between the input element and the base member.

An automotive radar system, in accordance with the present disclosure, includes a control printed circuit board (PCB) formed from a plurality of layers, the PCB including a recess and a waveguide attached to the PCB over the recess. The waveguide includes a chamber having a chamber wall defining a waveguide channel. The waveguide channel has a first dimension, a second dimension that is less than the first dimension, and third dimension. The first dimension extends along a first axis, the second dimension extends along a third axis, and the third dimension extends along a third axis. The first axis and the second axis extend substantially parallel to the PCB and the third axis extends substantially perpendicular to the PCB. A planar dual-probe microstrip transition is arranged in the recess. The planar dual-probe microstrip transition includes an input element connectable to a source of electrical energy and a base member connected to the input element. The base member includes a first end, a second end, and an intermediate portion. A first probe member extends from the base member. The first probe member includes a first end portion connected to the first end of the base member and a second end portion. A second probe member extends from the base member substantially parallel relative to and spaced from the first probe member. The second probe member includes a first end section joined to the second end of the base member and a second end section that is cantilevered from the base member. A tuning member extends from the second end portion of the first probe member toward the second end section of the second probe member. The tuning member establishes a phase difference between electrical energy flowing through the first probe member and electrical energy flowing through the second probe member.

In other features, the tuning member includes a first end segment joined to the second end of the first probe member and a second end segment that is spaced from the second end section of the second probe member.

In other features, the first end segment of the tuning member has a first dimension, and the second end segment of the tuning member includes a second dimension that is distinct from the first dimension.

In other features, the second dimension is less than the first dimension forming a stepped region at the second end segment.

In other features, the input element, the first probe member and the second probe member extend along the first axis, the first dimension and the second dimension being defined relative to the first axis.

In other features, the first probe member is spaced from the second probe member relative to the second axis that is substantially perpendicular relative to the first axis a selected distance, the selected distance establishing an output frequency for the planar dual-probe microstrip transition.

In other features, a matching stub provides an interface between the input element and the base member.

In other features, the waveguide includes a plurality of waveguides spaced across the PCB, each waveguide channel of each of the plurality of waveguides includes a centerline that extends along the first axis, the centerline of each waveguide channel being spaced from the centerline of an adjacent waveguide channel a distance of no more than 2.7-mm.

A method of emitting RF energy through a waveguide, in accordance with the present disclosure, includes transmitting electrical energy into an input element of a dual-probe microstrip, passing the electrical energy from the input element into a base member of the dual-probe microstrip, guiding the electrical energy from the base member into a first probe member and a second probe member that extend from the base member, the first probe member being spaced from the second probe member, and inducing a phase difference between the electrical energy flowing through the first probe member and the electrical energy flowing through the second probe member to generate the RF energy emitted through the waveguide.

In other features, inducing the phase difference includes creating a 180° difference between the electrical energy flowing through the first probe member and the electrical energy flowing through the second probe member.

In other features, inducing the phase difference includes passing the electrical energy flowing through the first probe member through a tuning member that extends towards and is spaced from the second probe member.

In other features, inducing the phase difference passing the energy through first and second 90° bends formed in the first probe member and a third 90° bend formed in the second probe member.

In other features, passing the energy from the input element into the base member includes directing the electrical energy through a matching stub that joins the input element to the base member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
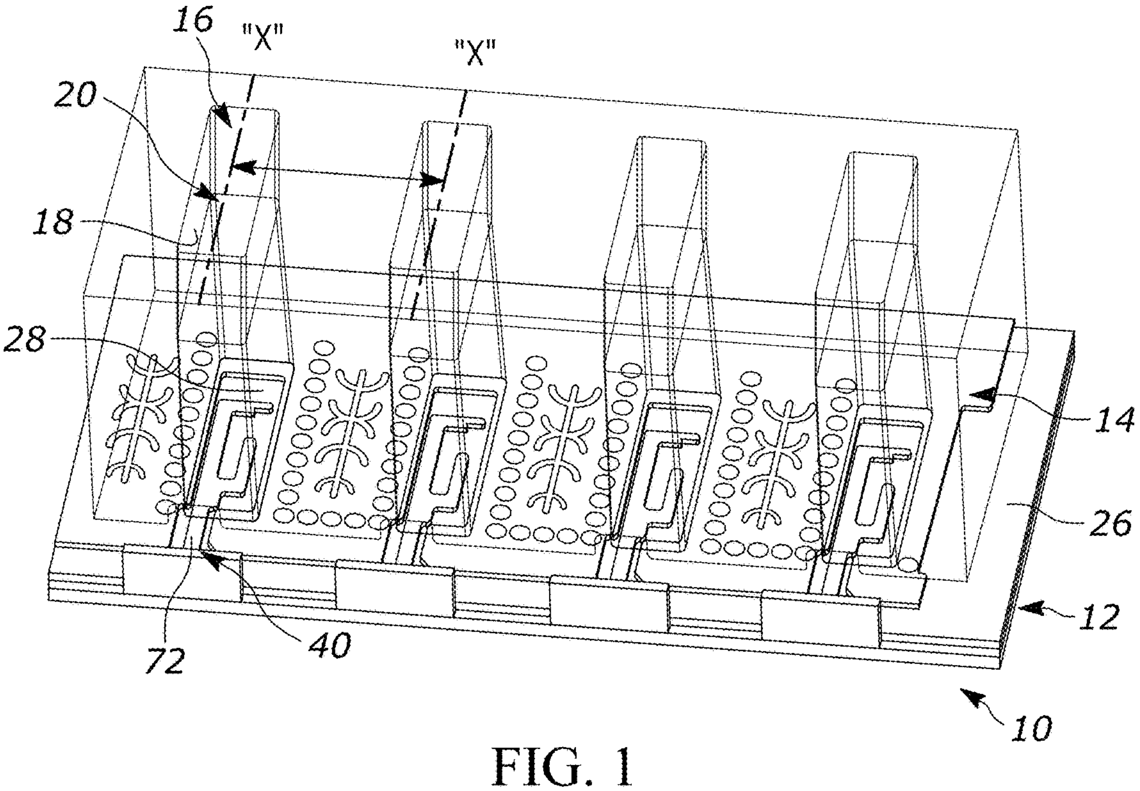
FIG. 1 is depicts a radar system having a plurality of waveguide assemblies mounted on a printed circuit board (PCB) over a corresponding plurality of planar dual probe microstrip transitions, in accordance with the present disclosure.
Figure 2:
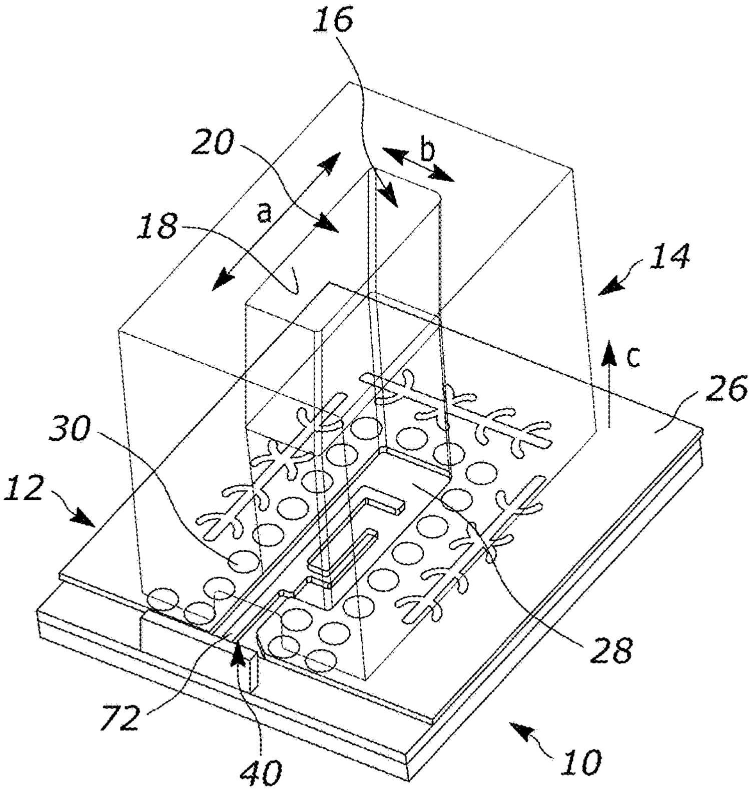
FIG. 2 is a perspective view of one of the waveguide assemblies and planar dual probe microstrip transitions of FIG. 1, in accordance with the present disclosure.

With reference to FIGS. 1 and 2, a radar system 10 is illustrated and includes a control PCB 12 that includes processing components for the radar system 10, such as one or more microprocessors, one or more power supplies, other integrated circuits (ICs) with one or more transmitter(s) or monolithic microwave integrated circuits (MMIC), one or more receiver(s), etc., used to generate and transmit RF radar signals used to detect objects in an environment of a vehicle as will be detailed more fully herein.

Radar system 10 includes a plurality of waveguides, one of which is indicated at 14. Waveguide 14 includes chambers, one of which is indicated at 16 defined by a chamber wall 18 that defines a waveguide channel 20. Waveguide channel 20 directs RF radar signals toward a radiator or emitter that transmits the RF radar signals toward a target (not shown). Waveguide channel includes a first dimension that is defined along a first axis "a", a second dimension that is defined along a second axis "b" that is substantially perpendicular relative to first axis "a", and a third dimension that is defined along a third axis "c" that is substantially perpendicular relative to first axis "a" and second axis "b". The first dimension defines a length of waveguide channel 20, the second dimension, which is less than the first dimension, defines a width of waveguide channel 20, and the third dimension establishes a height of waveguide channel 20. The first dimension includes a centerline "x" that defines a waveguide-channel-to-waveguide-channel pitch of radar system 10. Waveguide 14 sits on an outermost layer 26 of control PCB 12. Control PCB 12 is formed from a number of layers (not separately labeled) that include electrical traces (not shown) that connect to the processing components of radar system 10. Outermost layer 26 includes a recess 28 that is surrounded by a plurality of vias, one of which is indicated at 30. Vias 30 provide access to select portions of the electrical traces defined between the number of layers which form control PCB 12.

Figure 3:
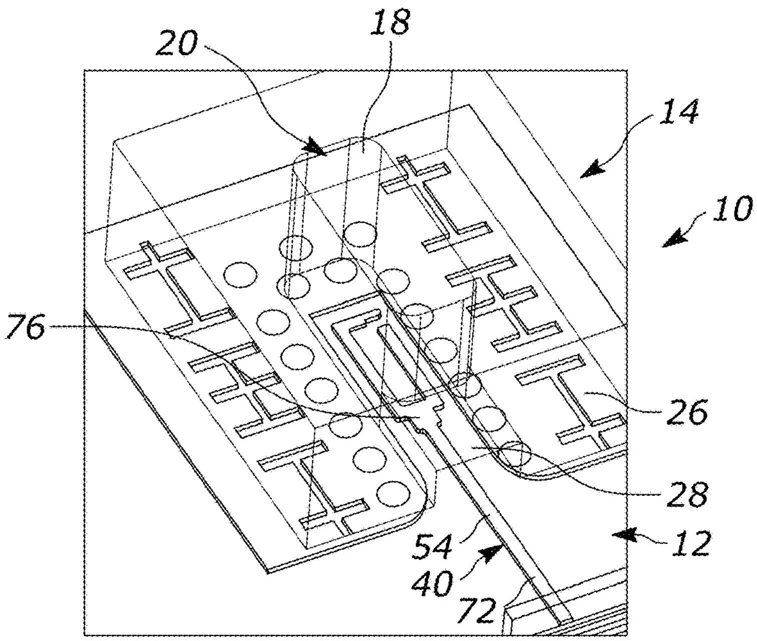
FIG. 3 depicts the planar dual-probe microstrip transition, in accordance with the present disclosure.
Figure 4:
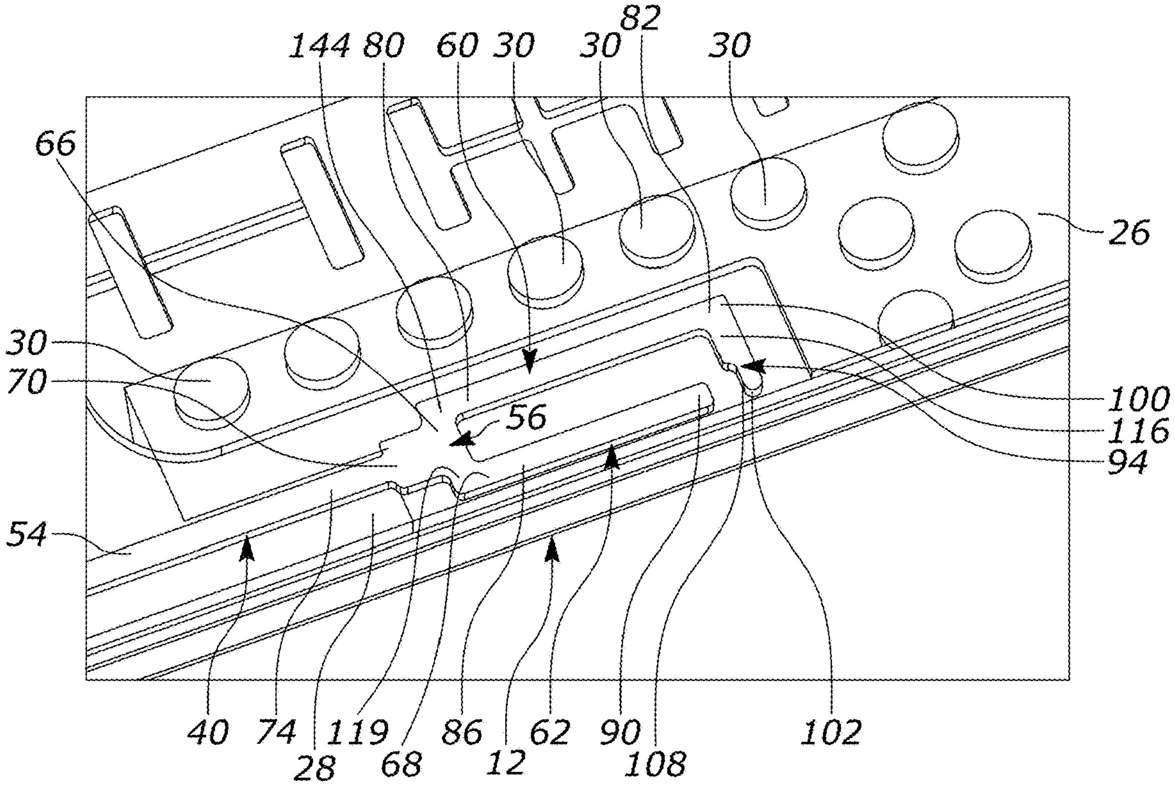
FIG. 4 is a detailed view of the planar dual-probe microstrip transition, in accordance with the present disclosure.

In a non-limiting example, radar system 10 includes a planar dual-probe microstrip transition 40 arranged in recess 28. As will be detailed more fully herein, planar dual-probe microstrip transition 40, when excited, produces the RF radar signals that pass through waveguide channel 20. Referring to FIGS. 3 and 4, planar dual-probe microstrip transition 40 includes an input element 54 connected to a base member 56. A first probe member 60 extends from base member 56 and a second probe member 62 extends from base member 56 substantially parallel to, and spaced from, first probe member 60.

In accordance with a non-limiting example, base member 56 includes a first end 66, a second end 68, and an intermediate portion 70 that extends between first end 66 and second end 68. Input element 54 includes a terminal end 72 connected to control PCB 12 and a feed end 74 that is electrically connected to intermediate portion 70 of base member 56. A matching stub 76 connects input element 54 with base member 56. Matching stub 76 forms an electrical transition between input element 54 and base member 56 to reduce losses. For example, input element 54 may have a first associated impedance, base member 56 may have a second associated impedance, and matching stub 76 may have a third associated impedance between the first and second associated impedance so as to provide an impedance transition between the base member 56 and input element 54. While shown as being generally rectangular, matching stub 76 may take on a variety of shapes including tapers, steps, and the like, depending upon the nature and/or magnitude of the desired transition.

First probe member 60 includes a first end portion 80 joined to first end 66 of base member 56 and a second end portion 82. Second probe member 62 includes a first end section 86 connected to second end 68 of base member 56 and a second end section 90 that is cantilevered from base member 56. A tuning member 94 extends from first probe member 60.

More specifically, tuning member 94 includes a first end segment 100 that is joined to second end portion 82 of first probe member 60 and a second end segment 102. Second end segment 102 is cantilevered from second end portion 82. Tuning member 94 extends towards, and is spaced from, second end section 90 of second probe member 62. In a non-limiting example, input element 54, first probe member 60, and second probe member 62 extend along control PCB 12 substantially parallel, to first axis "a".

In accordance with a non-limiting example, first end segment 100 of tuning member 94 has a first dimension defined relative to the first axis "a". Thus, the first dimension defines a width of tuning member 94. Second end segment 102 includes a second dimension defined relative to first axis "a". The second dimension is smaller than the first dimension and thus forms a step region 108 at second end segment 102.

As shown in FIG. 4, first probe member 60 includes a first 90° bend 114 at first end portion 80 and a second 90° bend 116 at second end portion 82. Second probe member 62 includes only a single 90° bend portion 119 at first end section 86. First 90° bend 114 defines a transition from base member 56 to first probe member 60 and second 90° bend 116 defines a transition from first probe member 60 into tuning member 94. First 90° bend portion 119 defines a transition from base member 56 to second probe member 62.

The length of first probe member 60 and second probe member 62 together with spacing between first probe member 60 and second probe member 62 created by first 90° bend 114 and first 90° bend portion 119 defines an operating bandwidth for planar dual-probe microstrip transition 40. That is, each probe member 60, 62 has a length that is approximately one-half of a wavelength of the radar signals being transmitted into the waveguide channel 20 by the planar dual-probe microstrip transition 40. Second 90° bend 116, tuning member 94, and step region 108 define additional operational parameters of planar dual-probe microstrip transition 40. More specifically, the location of second 90° bend 116, the length of tuning member 94, and/or the geometry of step region 108 for a given frequency creates a first electrical field along first probe member 60 and a second electrical field along second probe member 62. The properties of tuning member 94 and particularly step region 108 ensure that a phase difference of 180° exists between the first electrical field and the second electrical field.

Figure 5:
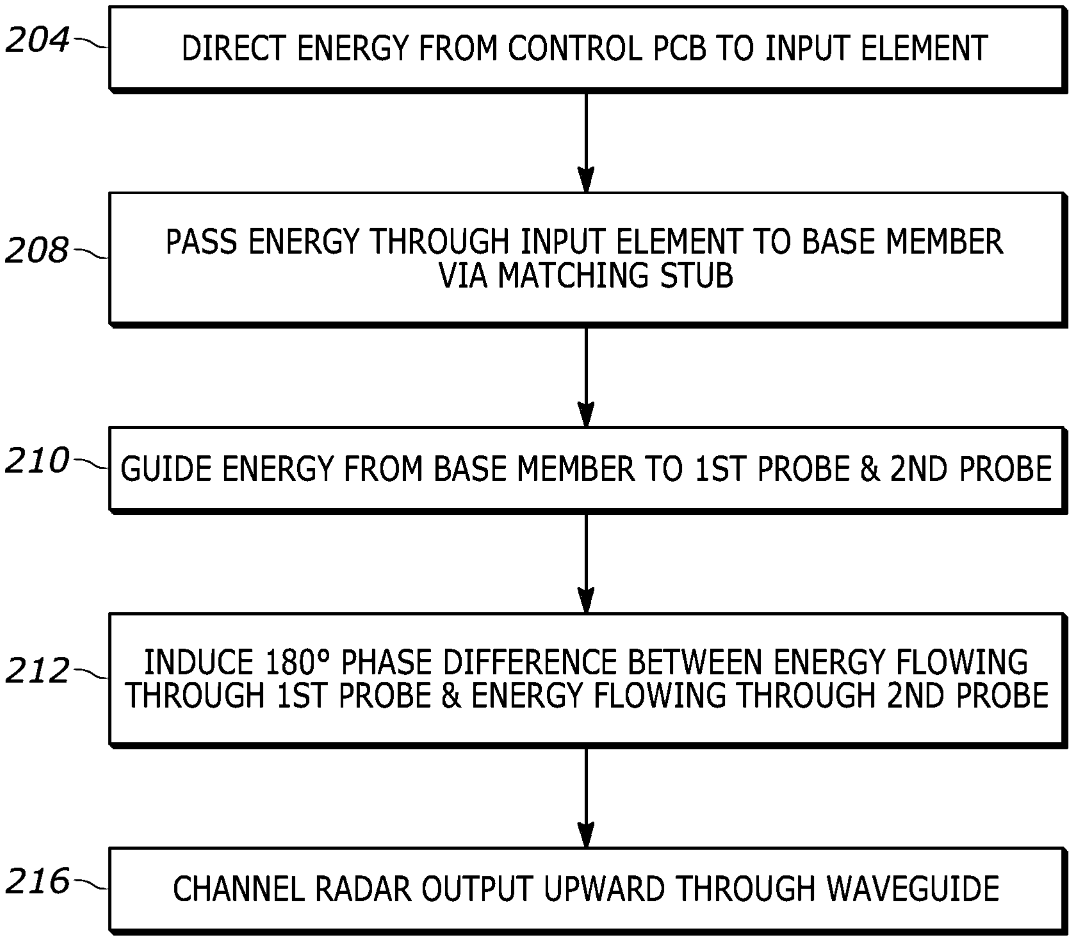
FIG. 5 is a flow chart illustrating a method of producing RF energy with the planar dual-probe microstrip transition, in accordance with the present disclosure.

Reference will now follow to FIG. 5 in describing a method 200 of producing an RF radar output from planar dual-probe microstrip transition 40. In block 204 energy is directed from control PCB 12 into terminal end 72 of input element 54. In block 208, the energy passes through input element 54 and from feed end 74 into base member 56 via matching stub 76. Matching stub 76 provides an electrical transition between input element 54 and base member 58 to reduce losses. The energy is then guided base member 56 into a first probe member 60 and from base member 56 into second probe member 62 in block 210. A 180° phase difference between the energy flowing through the first probe member 60 and the energy flowing through the second probe member 62 is induced by tuning member 94 and step region 108 in block 212. The 180° phase difference reduces signal losses to below 1 dB while at the same time achieving a wide waveband response that is focused upward. The RF radar output is then channeled upwardly from planar dual-probe microstrip transition 40 through waveguide channel 20 in block 216 and directed towards a radiator or emitter that transmits the RF radar output towards a target (not shown)

Eliminating a loop in the output antenna and, instead, forming two parallel probes has allowed the output from planar dual-probe microstrip transition 40 to be more focused and thus not as sensitive to via-to-metal registration differences that may exist in vias 30 surrounding recess 28. Reducing the via-to-metal registration sensitivity and focusing the RF radar reduces interference between adjacent RF signals that allow waveguide channel 20 to have a smaller dimension along the second axis "b".

Reducing waveguide channel width allows for a tighter waveguide-to-waveguide spacing of multiple guides extending across control PCB 12. The planar dual-probe microstrip transition in accordance with exemplary embodiments has been shown to accommodate a waveguide pitch distance between centerlines of adjacent waveguide channels of no more than 2.7-mm. Decreasing waveguide-waveguide spacing will lead to a number of benefits. Doing so without increasing interferences between emitted signals, increasing manufacturing tolerances, or imposing operational costs, such as increasing system operational losses will allow for a greater number of radar emitters to exist on a single PCB. Increasing the number of emitters on the control PCB will enhance detection range and detection accuracy.

The foregoing description of the embodiments has been provided for purposes of illustration and description and is not intended to be exhaustive or to limit the disclosure. Individual elements or features of a particular embodiment are generally not limited to that particular embodiment, but, where applicable, are interchangeable and can be used in another embodiment, even if not specifically shown or described. The various embodiments may also be varied in many ways. Such variations are not to be regarded as a departure from the disclosure, and all such modifications are intended to be included within the scope of the disclosure. Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough and will fully convey the scope to those who are skilled in the art. Specific details are set forth, including examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A planar dual-probe microstrip transition for an automotive radar system comprising:

an input element connectable to a source of electrical energy;

a base member connected to the input element, the base member including a first end, a second end, and an intermediate portion;

a first probe member extending from the base member, the first probe member including a first end portion connected to the first end of the base member and a second end portion;

a second probe member extending from the base member substantially parallel relative to and spaced from the first probe member, the second probe member including a first end section joined to the second end of the base member and a second end section that is cantilevered from the base member; and a tuning member extending from the second end portion of the first probe member toward the second end section of the second probe member, the tuning member establishing a phase difference between electrical energy flowing through the first probe member and electrical energy flowing through the second probe member, wherein the tuning member includes a first end segment joined to the second end of the first probe member and a second end segment that is spaced from the second end section of the second probe member, and wherein the first end segment of the tuning member has a first dimension, and the second end segment of the tuning member includes a second dimension that is distinct from the first dimension.

2. The planar dual-probe microstrip transition according to claim 1, wherein the second dimension is less than the first dimension forming a stepped region at the second end segment.

3. The planar dual-probe microstrip transition according to claim 1, wherein the input element, the first probe member, and the second probe member extend along a first axis, the first dimension and the second dimension being defined relative to the first axis.

4. The planar dual-probe microstrip transition according to claim 3, wherein the first probe member is spaced from the second probe member relative to a second axis that is substantially perpendicular relative to the first axis a selected distance, the selected distance establishing an output frequency for the planar dual-probe microstrip transition.

5. The planar dual-probe microstrip transition according to claim 1, further comprising: a matching stub providing an interface between the input element and the base member.

6. An automotive radar system comprising:

a control printed circuit board (PCB) formed from a plurality of layers, the PCB including a recess;

a waveguide attached to the PCB over the recess, the waveguide including a chamber having a chamber wall defining a waveguide channel, the waveguide channel having a first dimension, a second dimension that is less than the first dimension, and third dimension, the first dimension extending along a first axis, the second dimension extending along a second axis, and the third dimension extending along a third axis, the first axis and second axis extending substantially parallel to the PCB and the third axis extending substantially perpendicular to the PCB; and a planar dual-probe microstrip transition arranged in the recess, the planar dual-probe microstrip transition comprising:

an input element connectable to a source of electrical energy;

a base member connected to the input element, the base member including a first end, a second end, and an intermediate portion;

a first probe member extending from the base member, the first probe member including a first end portion connected to the first end of the base member and a second end portion;

a second probe member extending from the base member substantially parallel relative to and spaced from the first probe member, the second probe member including a first end section joined to the second end of the base member and a second end section that is cantilevered from the base member; and a tuning member extending from the second end portion of the first probe member toward the second end section of the second probe member, the tuning member establishing a phase difference between electrical energy flowing through the first probe member and electrical energy flowing through the second probe member, wherein the tuning member includes a first end segment joined to the second end of the first probe member and a second end segment that is spaced from the second end section of the second probe member; and wherein the first end segment of the tuning member has a first dimension, and the second end segment of the tuning member includes a second dimension that is distinct from the first dimension.

7. The automotive radar system according to claim 6, wherein the second dimension is less than the first dimension forming a stepped region at the second end segment.

8. The automotive radar system according to claim 6, wherein the input element, the first probe member and the second probe member extend along the first axis, the first dimension and the second dimension being defined relative to the first axis.

9. The automotive radar system according to claim 8, wherein the first probe member is spaced from the second probe member relative to the second axis that is substantially perpendicular relative to the first axis a selected distance, the selected distance establishing an output frequency for the planar dual-probe microstrip transition.

10. The automotive radar system according to claim 6, further comprising: a matching stub providing an interface between the input element and the base member.

11. The automotive radar system according to claim 6, wherein the waveguide includes a plurality of waveguides spaced across the PCB, each waveguide channel of each of the plurality of waveguides includes a centerline that extends along the first axis, the centerline of each waveguide channel being spaced from the centerline of an adjacent waveguide channel a distance of no more than 2.7-mm.

12. A method of emitting RF energy through a waveguide, the method comprising:

transmitting electrical energy into an input element of a dual-probe microstrip;

passing the electrical energy from the input element into a base member of the dual-probe microstrip;

guiding the electrical energy from the base member into a first probe member and a second probe member that extend from the base member, the first probe member being spaced from the second probe member; and inducing a phase difference between the electrical energy flowing through the first probe member and the electrical energy flowing through the second probe member to generate the RF energy emitted through the waveguide with a tuning member including a first end segment joined to the first probe member and a second end segment that is spaced from the second probe member, the first end segment of the tuning member has a first dimension, and the second end segment of the tuning member includes a second dimension that is distinct from the first dimension.

13. The method of claim 12, wherein inducing the phase difference includes creating a 180° difference between the electrical energy flowing through the first probe member and the electrical energy flowing through the second probe member.

14. The method of claim 12, wherein inducing the phase difference passing the energy through first and second 90° bends formed in the first probe member and a third 90° bend formed in the second probe member.

15. The method of claim 12, wherein passing the energy from the input element into the base member includes directing the electrical energy through a matching stub that joins the input element to the base member.

* * * * *